US009807229B1

(12) United States Patent
Gutierrez, Jr. et al.

(10) Patent No.: US 9,807,229 B1
(45) Date of Patent: Oct. 31, 2017

(54) WIRELESS CUSTOMER EXPERIENCE FAULT ANALYTICS SYSTEM AND METHOD OF OPERATION

(71) Applicants: Alberto Gutierrez, Jr., San Mateo, CA (US); Chang-Jia Wang, San Ramon, CA (US)

(72) Inventors: Alberto Gutierrez, Jr., San Mateo, CA (US); Chang-Jia Wang, San Ramon, CA (US)

(73) Assignee: CARRIER IQ, INC., Sunnyvale, CA (US)

( * ) Notice: Subject to any disclaimer, the term of this patent is extended or adjusted under 35 U.S.C. 154(b) by 0 days.

(21) Appl. No.: 14/511,442

(22) Filed: Oct. 10, 2014

(51) Int. Cl.
*H04M 3/00* (2006.01)
*H04M 3/08* (2006.01)
*H04W 24/04* (2009.01)

(52) U.S. Cl.
CPC .......... *H04M 3/085* (2013.01); *H04W 24/04* (2013.01)

(58) Field of Classification Search
USPC ....................................................... 455/425
See application file for complete search history.

(56) References Cited

U.S. PATENT DOCUMENTS

2008/0155346 A1* 6/2008 Britt .................. H04L 41/14
714/43

* cited by examiner

*Primary Examiner* — Kabir A Timory
(74) *Attorney, Agent, or Firm* — Workman Nydegger (57) ABSTRACT

A minimum confidence level is applied to recognize a localizable wireless system debility from a debility which is invariant from place to place or which cannot be significantly distinguished from service performance levels of comparable mobile user terminals in the network as a whole. Reports received by the population of users of a service or product family are scored, aggregated, normalized, and averaged overall and for each geographic service area. A report is received from a particular end user and the customer operated wireless instrument and transformed into an individual user experience score over a length of time and breadth of locations. The reports provided by the population of users are transformed into a population experience score that reflects usage in the same time and locations reported from the wireless instrument of the particular end user. Various potential causations are considered and those which exceed a minimum level of confidence are presented.

12 Claims, 9 Drawing Sheets

| DEVICE | CELL | CALLS | DROPS | DROPRATE | MDROPRATE (correct aggregation) | MDROPRATE (incorrect aggregation) |
|---|---|---|---|---|---|---|
| D1 | C1 | 10 | 1 | 10% | 3 | 3 |
| D2 | C1 | 10 | 1 | 10% | 3 | 3 |
| D3 | C1 | 1000 | 0 | 0% | 5 | 5 |
| All devices | C1 | 1020 | 2 | .2% | 3.7 | 5 |

FIG.9

© Carrier IQ Inc. 2014

WIRELESS CUSTOMER EXPERIENCE FAULT ANALYTICS SYSTEM AND METHOD OF OPERATION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

One aspect of the invention is fault segmentation i.e. error location within a wireless and wired network of voice and data service providers and their support for user mobile devices. This includes recording data at a plurality of devices employing modulated carrier wave communications and aggregating measurements by device subsystem and also by location in a cellular radio link.

Description of the Related Art

As is known, edge of network and device metrics may be captured, and forwarded upon rule-based triggers to an analysis platform according to U.S. Pat. No. 7,551,922.

Issues causing poor customer experience and device returns are responsible for very large costs to wireless operators and device manufacturers. For example, in 2006, WDS reported that No Fault Found (NFF) returns, was a 4.5 billion dollar industry problem. After conventional failure analysis, 66% of the smart phone returns were determined to be NFF. However, upon further study NFF issues were considered likely to be preventable and often attributable to customer dissatisfaction resulting from poor experience. Customer dissatisfaction may be in such aspects as disappointing reliability, availability, intermittence, low quality of results, incompatibility, user interface frustration, or general failure to meet expectations.

Although some customer dissatisfaction issues have been solved by device manufacturers, the challenge of providing high levels of customer satisfaction to smart phone users continues as a significant and ever more costly challenge, especially with increasing number of devices deployed, each with higher levels of complexity. For example, in 2013 JD Power reports that 17% of smart phone users experience a device malfunction and that the most unsatisfying smart phone feature is shorter than expected battery life.

Thus, it can be appreciated that what is needed is a customer experience fault analytics system improved to identify causes of poor customer experience so that 1) the experience can be remediated in place or 2) to reliably indicate when a device may be usefully returned.

It would be beneficially advantageous if a correction could be made to a customer's existing device over the air or by suggestions to the user without transporting the device to a service depot. It would be beneficially advantageous to identify any location in a cellular radio link, which has a potential mismatch with a class or cohort of user devices.

BRIEF SUMMARY OF THE INVENTION

A system, apparatus, and method of operation receive and transform measurements from a plurality of wireless devices into scores for each mobile end user experience for use by a customer support organization to guide investment in the network, achieve customer satisfaction with services and wireless devices, and thereby reduce costs of returned equipment and lost customers.

One transformation uses the location history of a specific mobile device to build a synthetic user experience score that includes only the portion of the population, which also reported from the same locations. A minimum confidence level is applied to recognize a wireless system debility which can be distinguished from service performance levels of comparable mobile user terminals in the network as whole and furthermore to distinguish a localizable wireless system debility from a debility which is invariant from place to place. An individual user experience score is compared with a score derived from all users. Another experience score is derived for the locations (cells) corresponding to the locations the individual user visited in obtaining his score.

Reports received by the population of users of a service or product family are scored, aggregated, normalized, and averaged; both overall, and for each geographic service area. Distinct services such as voice and data have distinct scores for each cell in a cellular system based on reports received from every user of that cell. A report from a particular end user and the customer operated wireless instrument is transformed into an individual user experience score over a length of time and breadth of locations.

Typically, a particular end user is on the phone to discuss a performance disappointment or failure with a Customer Support Representative (CSR). The Customer Support Representative may access previously uploaded data, surveys, and metrics, which contribute to a user experience score. The list of locations visited may be obfuscated for privacy but still remain unique for apples to apples analysis. The reports provided by the population of users are transformed into a population experience score that reflects usage in the same time and locations reported from the wireless instrument of the particular end user. The service cells which the particular end user visited are identified and average performance measures are extracted from that portion of the population which utilized the same network infrastructure.

Corresponding to the determined debility, various potential causations are considered and those which exceed a minimum level of confidence are presented. The system may calculate and apply probabilities to alternative conclusions. Often there may be more than one possible causation and all might still be wrong. The system compares aggregated scores for a mobile device used in selected geographic service areas with the actual score of a particular end user of a particular wireless service in the identical geographic service area to determine when there is a statistically significant relative debility.

Initially, the system determines when there is or is not statistically significant relative debility of the particular end user mobile device in comparison with the entire population. The system transforms a collection of stored user experience scores into a score, which can be directly compared with an individual's user experience score to determine, with a degree of confidence, similarity or dissimilarity. This may direct the customer support staff to address dimensions of customer satisfaction other than equipment or networking.

A system includes a wireless customer experience fault analytics server coupled to a plurality of wireless user devices (devices). Each of the devices records measurements related to customer experience in each of a plurality of locations in a cellular radio network (cells). The Applicants now disclose a customer experience fault analytics system which provides the following characterization of a customer experience fault (fault):

Customer Experience Fault detection, symptom, disturbance, or manifestation (detection),
Device Vs. Network fault (localization), and
Root Cause.

"Failure analysis is the process of collecting and analyzing data to determine the cause of a failure. It is an important discipline in many branches of manufacturing industry, such as the electronics industry, where it is a vital tool used in the development of new products and for the improvement of existing products. There are many companies which provide services to find the cause of failure in products, devices and in post disaster situations . . . " (source en.wikipedia.org/wiki/Failure_analysis). Traditionally, failure analysis has been a tool applied after product returns for improving existing products and for design of new products. However, in contrast to traditional failure analysis, the conventionally unmet need is to identify and remedy issues (i.e., "customer experience disappointments") while a device remains in user service in order to fix issues that cause poor customer experience and thereby improve customer satisfaction as a prophylactic to device returns or customer churn.

In the context of this patent application for a customer experience fault analytics system, these characteristics are defined as a "fault signature (signature)." Combinations of these characteristics provide increasing detail and actionable information regarding the fault. The information available for fault analysis may enable determination of a complete fault signature or a partial fault signature. For example, it may be possible to detect that a device is delivering poor battery experience anywhere, anytime, using any application. Furthermore, the fault could be localized to the device due to root cause of a combination of device settings. Or, for example, the root cause could be indeterminable. In yet a third case the fault could be due to the network (including the radio environmental conditions of the cell) without more specific, root cause information.

BRIEF DESCRIPTION OF THE SEVERAL VIEWS OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

All of the following transformations and logic operations are performed by an electronic circuit communicatively coupled to a non-transitory data store. As is known, physical quantities such as battery charge and radio signal strength can be represented and stored as binary values in computer-readable media for analysis at a subsequent time.

Wireless carriers, mobile device retailers, and handset original equipment manufacturers (OEM's) have customer support roles that may be self-interested and/or may be contractual. The cost of customer churn and of returned equipment is non-trivial and expanding. Thus it would be desirable for an improved system, apparatus, and method to provide customer support organizations affiliated with one or more of the value chain to have a higher level of confidence in triaging customer issues into within normal performance but unsatisfactory to the individual user, a transient issue substantially localizable to identifiable wireless service geography, or a recurring issue that is invariant to mobility or the environment of a wireless service geography.

A subissue of the latter is a hard defect which may only be resolved by return, repair, replacement, upgrade, or trade-in for any confidence, or a soft defect related to firmware, configuration, or conflicts in applications which might be identified and resolved without removing the device from service for an appreciable period.

Given a desired confidence level, how may a mobile device be determined to have a location invariant debility relative to the comparable population of mobile devices without removing it to a service depot. The widely popular use of mobile devices provides a natural experimental base with variables in location, make, model, settings, configurations, and components already fully elaborated for comparison.

Although a common result of depot service diagnostic of returned and restored phones is "No Fault Found," we will define a term Debility for use within the following disclosure to avoid the unintended implications of the word Fault in popular zeitgest.

Fault Analytics Concept Overview

As stated earlier the key goal of the fault analytics is to provide three measures of a fault: fault detection, device vs. network fault localization and root cause.

Figure 2:
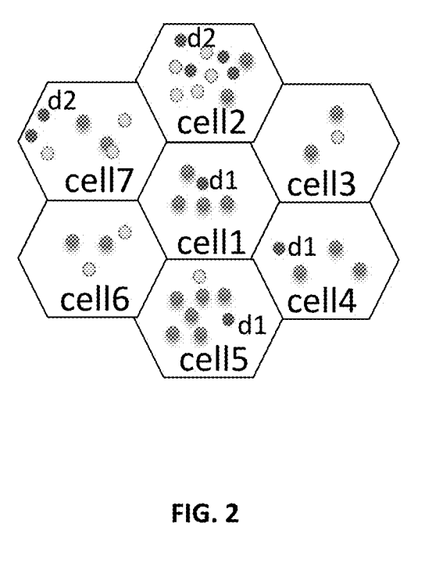
FIG. 2 is an exemplary map of service location cells populated by device census using color.

Consider a set of mobile devices that travel through a wireless network and receive service from the corresponding cells. As illustrated in FIG. 2, devices report good (green), mediocre (yellow), or poor (red) service according to the cells that they visit. Suppose device d1 has a problem, for example, its dropped call rate "KPId" is determined to be abnormally bad. In other words, the drop call rate is high. Furthermore, we do not know the reason, i.e. "root cause". In this situation, in order to guide the wireless operator customer care organization on whether to replace the device or not then it is useful to know if the problem lies in the device or in the network. If the problem lies with the network then do not accept a return whereas if the problem lies with the device then accept a return.

Figure 7:
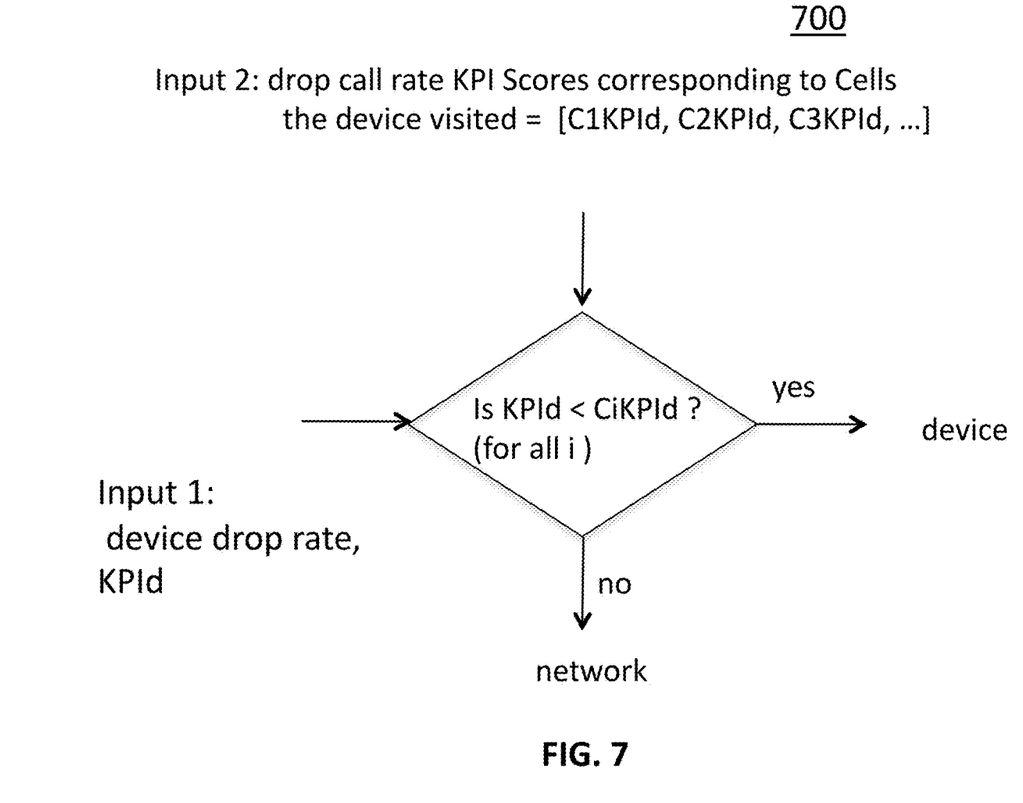
FIG. 7 is a logic transformation.

In essence the methods employed here are to determine if the problem is an environmental problem (i.e., the network) or if the individual (i.e., device) performs badly independent of the environment. FIG. 7 illustrates a decision circuit that will identify the network or device as location. Input 1 is the devices drop call rate, KPId. The second input is the drop rate score for each cell visited by the device, CiKIPId. For example the CiKPId is computed by taking the drop call rate for each device that visited cell Ci (the KPI is measured only while obtaining service from cell i) and obtaining an aggregate CiKPId corresponding to the average over all devices visiting cell i. If the KPId<CiKPId is true for all i then the problem is determined to be the device. In this case, the device is found to give poor performance in any cell it visits whereas other devices in the vicinity do provide good performance, thus the device is determined to be deviant. Conversely, if the condition is false then the device's poor performance is commensurate with the environment so that the apparatus determines that the environment (i.e., network) is at fault.

In a more sophisticated example, device 1 ("d1") receives service from cell5, cell1 and cell4. In the example depicted by the figure each of the cells that d1 visits generally provide good service to the devices that visit them. This is denoted by the green dots in the corresponding cells. However, d1 experiences poor service seemingly independent of the otherwise good level of service delivered by the cells that it visits. In this case, we may deduce that the fault causing d1's poor service lies within d1 and not the network.

In contrast, d2 receives its service from cell2 and cell3 and in this case experiences poor service quality. In contrast to d1 the cells providing service to d2 deliver a lower grade of experience than those providing service to d1. In the case of d2, we may deduce that the fault causing the poor service is due to network service quality.

So far, the examples have illustrated the concept of fault detection and device vs. network fault localization. When a fault is found, then applying further root cause analysis may find the source of the problem, for example an application on the device is over consuming battery resources.

The subject matter of this application is the transformation of mobile user experience scores into a measure that isolates the fault to device or network. A fault model is derived by analyzing the statistical characteristics corresponding to a crowd of devices, which are representative of network conditions and device behavior. For each customer call, the system determines when there is or is not statistically significant relative debility of the particular end user mobile device in comparison with the entire population. A minimum confidence level is applied to recognize a localizable wireless system debility from a debility which is invariant from place to place or which cannot be significantly distinguished from service performance levels of comparable mobile user terminals in the network as a whole.

A beneficial transformation of data recorded at a plurality of user devices by the subject fault analytics apparatus is to provide three measures of a fault: fault detection, device vs. network fault localization and root cause to a display apparatus for decision making by a customer support representative. On the one hand, if root cause information is always obtainable then that itself will provide the device or network fault location. However, even when the root cause information is not available, isolating the problem to the device or network provides valuable and actionable information. The subject matter of the present disclosure are computer-implemented methods for heuristically isolating a fault to device or network and transforming such data along with fault detection, symptoms, disturbance, or manifestation and root cause into a so-called fault signature.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Figure 3:
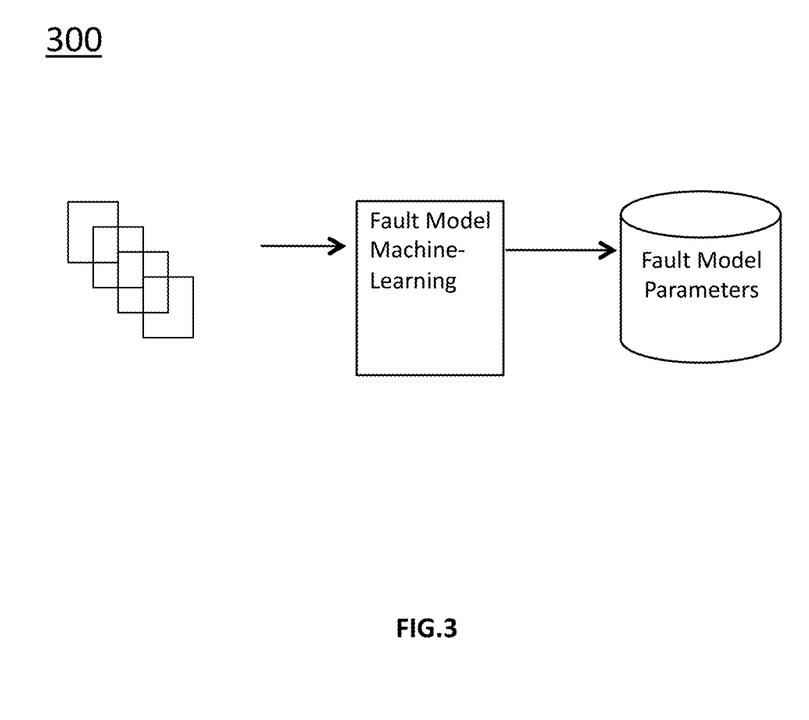
FIG. 3 illustrates deriving and storing crowd characteristics.

The fault model characteristics are in the form of derived parameters, vectors and matrices. As shown in FIG. 3, these crowd characteristics are stored in memory for subsequent use.

Figure 4:
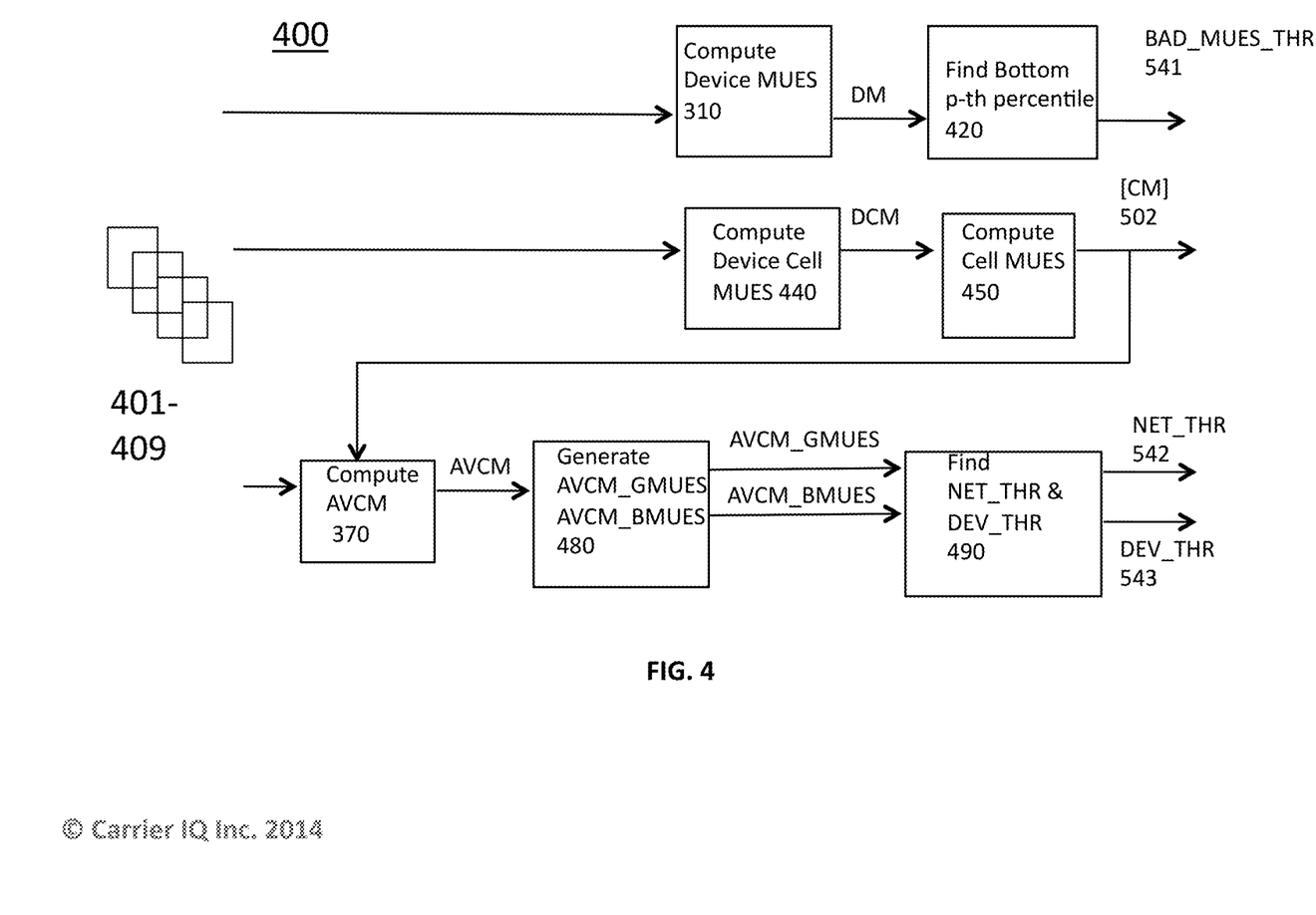
FIG. 4 are elements of the transformation to device and crowd parameters.

FIG. 4 is a system diagram 400 of circuits which determine crowd parameters from data received from a plurality of wireless devices 401-409. Three crowd parameters are thresholds which distinguish a statistically significant deviation from the crowd: BAD_MUES_THR 541, NET_THR 542, AND BEV_THR 543. A fourth crowd parameter CM 502 is a vector of parameters aggregated for each of the cellular service areas of a network. Each of the circuits of system 400 may be more easily described as mathematical transformations which as is know may be embodied as analog circuits, digital circuits, or instructions controlling a processor, the instructions stored in non-transitory media. The transformations are applied to signal values and times and derivative meta data recorded by baseband processors of wireless devices measurements of radio frequency energy.

Figure 5:
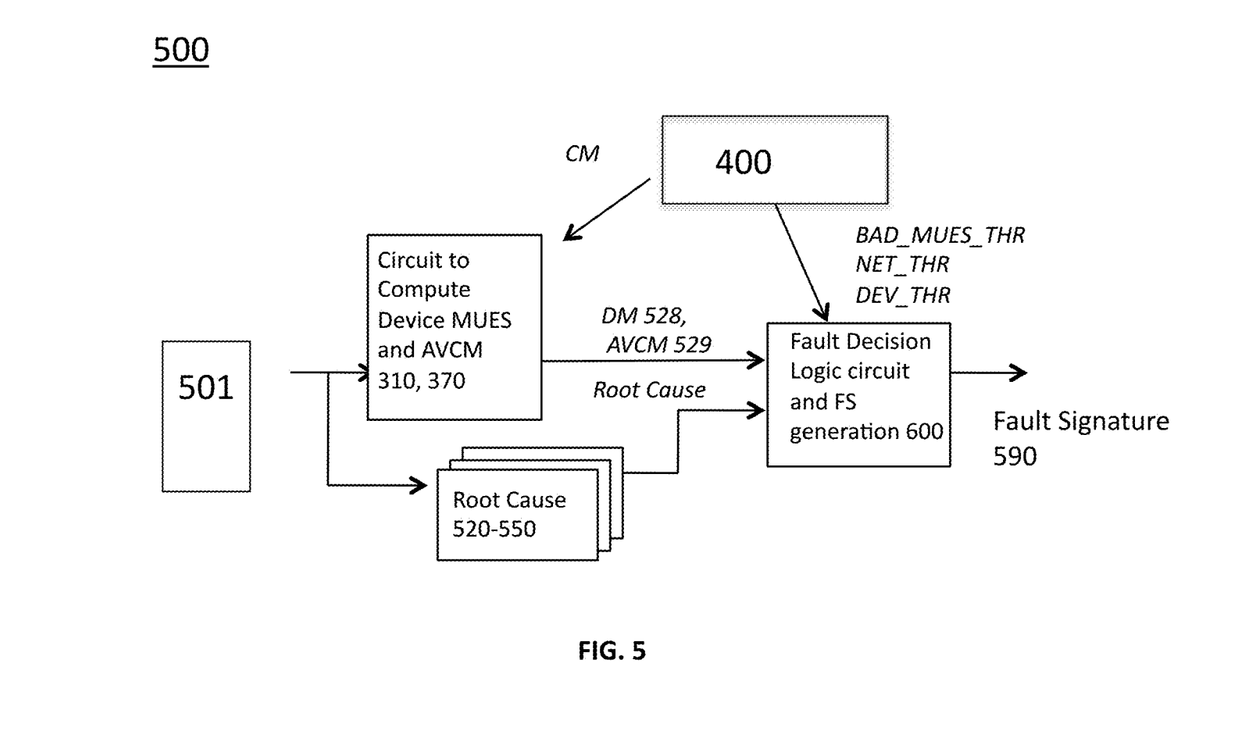
FIG. 5 is an overview of the system.

FIG. 5 is a system diagram which determines FS 590 by coupling a logic tree 600 to a plurality of root cause matching circuits 520-550 to a circuit to determine device specific parameters 300 for a specific device 501, and to a plurality of circuits to determine crowd parameters 400.

Figure 6:
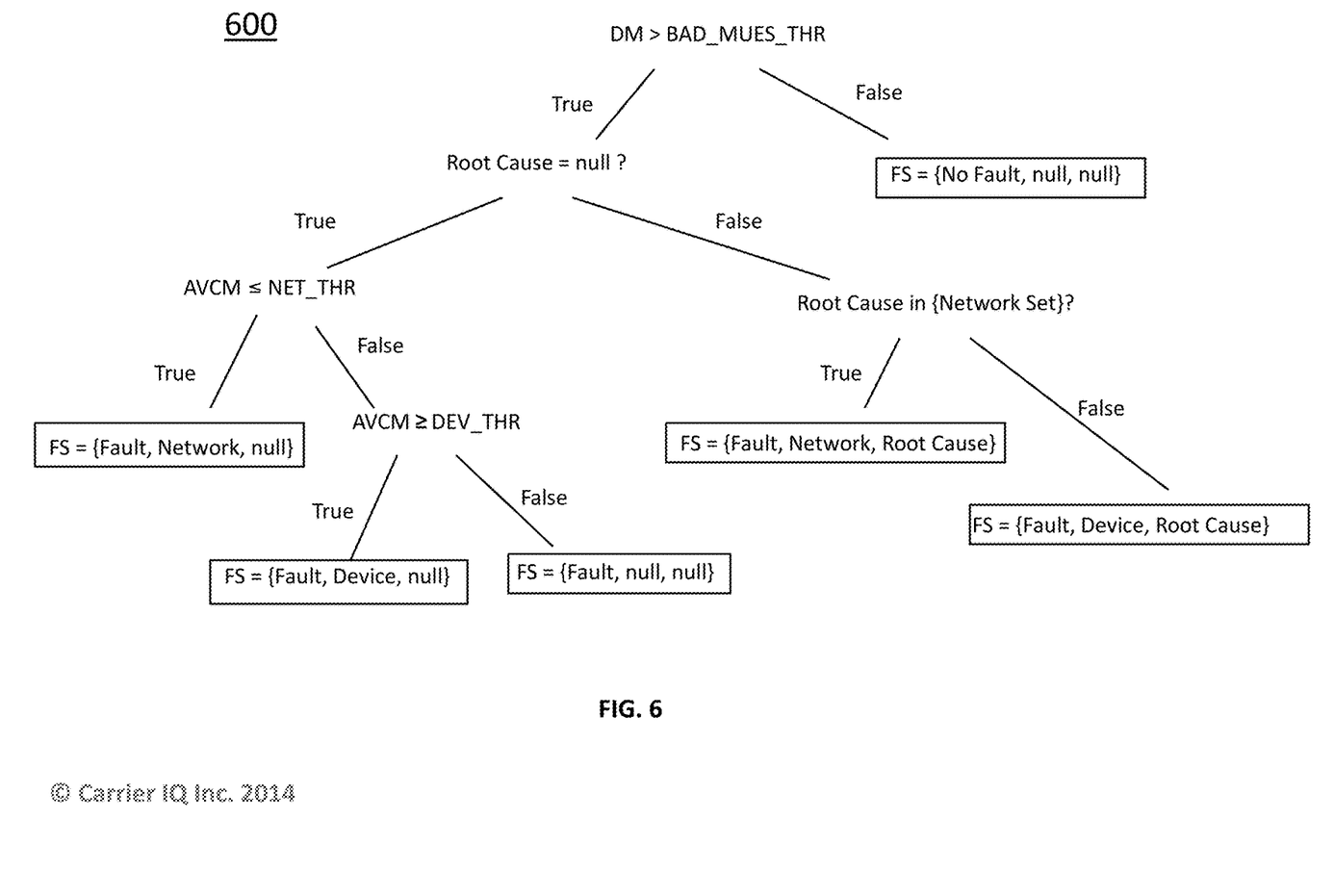
FIG. 6 is a logic tree.

FIG. 6 is a circuit specification as a logic tree for binary operation by Boolean logic gates, a field programmable gate array (FPGA), or a circuit controlled by non-transitory media containing instructions to determine three elements of an FS vector. In some cases, the circuit determines that an element has the value of NULL. The inputs of the circuit specification for determining the FS vector include crowd parameters determined by circuits receiving data recorded and transmitted by each one of a population of wireless devices which are served in a radio network. These crowd parameters are thresholds: BAD_MUES_TR, NET_THR, and DEV_THR. Other inputs to the circuit specification for determining the FS vector include device specific data determined by circuits receiving data recorded and transmitted by a particular wireless device. These include the DM, and Root Cause inputs. Anther input, AVCM, is determined by data from a particular wireless device and from comparable wireless devices selected from the population of wireless devices which are served in a radio network.

A fault signature determination circuit 500 applies a decision tree logic cone 600 to, device specific parameters 528, 529, stored crowd parameters 541 542, 543, and a plurality of matching root causes 520-550 to determine a fault signature 590 to classify a specific user experience at a specific device 501 into a fault signature category.

The plurality of matching root causes 520-550 is a reference which relates symptoms and performance characteristics which are consistent with hardware limitations in the network or in a specific configured device subsystem.

The device specific parameters are determined from data recorded in recent history from a specific identified user device 501. A circuit 300 receives data recorded at and transmitted from a specific mobile device 501 and determines a device mobile user experience score 528 and in conjunction with a vector of all cell mobile user experience scores 502 determines an average visited cell mobile user experience score 529.

The stored crowd parameters are used by the decision tree logic cone to determine if the device specific parameters are statistically significant i.e. are substantially distinguishable from corresponding scores from the served network or the entire population of devices operating in the served network. Crowd statistics 502, 541, 542, 543 are determined from data recorded at and transmitted from each of a plurality of devices 401-409 utilizing a served network.

The fault model process consists of a set of steps, which factor in the use of parameters generated by the machine learning (i.e. training phase). Application of the fault model to the requisite set of device information will generate the fault signatures. Although the fault analytics system reports root cause in the fault signature and the root cause may also employ machine learning and generation of a root cause predictive model, the details of such machine learning and predictive analytics (for root cause) is out the scope of this document. The scope of this document is to develop a fault model that performs fault detection, device vs. network fault localization and properly integrates root cause information into the fault model and corresponding fault signature.

The machine learning derives the necessary network and device characteristics so that after the fault model parameters are generated they can be applied so as to generate a fault signature for the device. Machine learning derives a set of parameters for identifying a device with an experience fault and to identify if the fault is correlated to network delivered experience or device specific experience. The fault model can be tuned for specific sensitivities, improved with better or additional rules and parameters or even changed to another type of model.

For each customer call, the system determines when there is or is not a statistically significant relative debility of the particular end user experience in comparison with the entire population. Then, a minimum confidence level is applied to recognize a localizable system debility from a debility which is invariant from place to place or which cannot be significantly distinguished from the range of service performance levels of comparable mobile user devices within the network. The fault model generation process is illustrated in FIG. 4. The process of generating the fault model is also referred to as "Machine-Learning."

The first decision rule parameter (BAD_MUES_THR) is for the purpose of fault detection.

BAD_MUES_THR=the MUES value corresponding to the bottom P-th quantile of P(Device MUES), for example bottom 10%.

For example, when a device MUES is less than or equal to BAD_MUES_THR then fault detection is true, otherwise false.

The subject matter of this application is the transformation of mobile user experience scores into a measure that isolates the fault to device or network. The next three decision parameters are designed for this purpose. The decision process uses the values of these variables for the generation of the fault signature.

The fault model is derived by analyzing the statistical characteristics corresponding to a crowd of devices, which are representative of network conditions and device behavior. The fault model generation procedures include first computing the MUES (Mobile User Experience Score) for each device, $d_x$m and thus generating the vector of device experience scores DM=[$d_1$m $d_2$m $d_x$m $d_4$m $d_5$m]. From the DM vector calculate the BAD_MUES_THR. $F_x(m)$ is the cumulative distribution function of DM, corresponding to the probability distribution of MUES scores experienced by all devices. BAD_MUES_THR=$m_p$ corresponds to the MUES value p where $F_x(m_p)$=p. For example, say BAD_MUES_THR corresponds to the devices with the bottom 10% of MUES scores, then p=0.1, and $m_p$ is the solution to $F_x(m_p)$=p.

For convenience the vectors and matrices in this description are of small cardinality, for example 5 devices and 7 cells. However, in reality there may actually be 10's of millions of devices and 100's of thousands of cells.

Reports received from the population of all users of a service or product are scored, aggregated, normalized, and averaged; both overall and for each geographic service area.

CM=Vector of MUES delivered by each cell. One MUES value for each cell, where the MUES value for each cell represents the normative experience delivered to the mobile devices that have visited the cell.

NET_THR=the AVCM value corresponding to bottom P-th quantile of the conditional probability P(AVCM|BMUES), for example bottom 5%.

DEV_THR=the AVCM value corresponding to top P-th quantile of the conditional probability P(AVCM|BMUES), for example top 5%.

The method for determining a CM vector: Compute the matrix DM comprising the MUES scores corresponding to the experience of each device in each cell $$DCM = \begin{bmatrix} d_1c_1m & d_1c_2m & \cdots & d_1c_7m \\ d_2c_1m & d_2c_2m & & d_2c_7m \\ \vdots & & \ddots & \\ d_5c_1m & d_5c_5m & & d_5c_7m \end{bmatrix}$$

The reports provided by the population of users are transformed into a population experience score that reflects usage in the same time and locations reported from the wireless instrument of the particular enduser.

Compute the Cell_MUES vector CM where each element is the sum of column j divided by the non-zero cardinality of column j. In other words each term is a simple average of the values in column j. These values represent the average MUES delivered by cell j to the devices that visited cell j.

With reference to the bottom row of the figure, we describe how to compute the DEV_THR and NET_THR. To generate the DEV_THR and NET_THR we develop a measure of the experience quality that the network delivers, AVCM, where each element of the AVCM vector corresponds to the average MUES delivered by the network corresponding to the cells that device i visited. Let DCI by the matrix containing a 1 in row i and column j if device i received service from cell j, otherwise if the device did not receive service from cell j the entry is 0. AVCM is generated by taking the product of the CM vector and the normalized DCI matrix. DCI is normalized such that the sum of any row of =1 except for DCI rows that are empty (all zero). The result of this equation is the AVCM vector, where each entry is the average MUES score delivered to the mobiles that visited the cells visited by device i.

Next, from AVCM derive P(AVCM|G MUES), the probability distribution (conditional probability) of AVCM scores corresponding to devices with good MUES and P(AVCM|B MUES), the probability distribution (conditional probability) of MUES scores corresponding to devices with bad MUES.

Methods of determining NET_THR: Set NET_THR to the largest AVCM value satisfying the following conditions: P(AVCM|GMUES)<0.05 AND P(AVCM|BMUES)>0.95. Devices with AVCM<NET_THR are 95% likely to have a bad experience and are unlikely to have a good experience (5% probability). Devices that satisfy these characteristics are correlated to poor experience as a result of delivered network experience. In other words, devices that receive this level of delivered network experience are very unlikely to have a good experience and very likely to receive poor experience. Optionally, set NET_THR according to the first condition. For example even significantly relaxed settings to identify issues that are more likely network issues can provide positive business benefits.

The method for determining DEV_THR: Set DEV_THR to the smallest AVCM value satisfying the following conditions: P(AVCM|BMUES)<0.05 AND P(AVCM|GMUES) >0.95. Devices that satisfy these characteristics are at odds with the other mobiles receiving the same level of delivered network experience. Although at this level of AVCM (delivered network experience) other mobiles are very likely to have good MUES, these mobiles with bad MUES and AVCM>DEV_THR are rare and thus at odds with the experience of other mobiles. Optionally, set DEV_THR according to the first condition. Furthermore, the precise percentile settings are used to adjust the DEV_THR. For example, even significantly relaxed settings to identify issues that are more likely device issues can provide positive business benefits.

Experience Representation and Aggregations for Fault Analytics

Various potential causations are considered and those which exceed a minimum level of confidence are presented. The customer experience may be measured in various forms. For example, in wireless it is typical to track key performance indicators. One such example is data speed, from the perspective of the mobile device Data Received Kbps ("RXTPT") or Data Transmitted Kbps (TXTPT). Furthermore it is quite possible that 7 such KPIs, in which case a mobile experience score ("MUES") may be employed. The MUES represent the dependent variable response of a function with independent variables being KPIs. Experience scores may be further categorized into experience dimensions such as VOICE, DATA, COVERAGE, BATTERY, and DEVICE STABILITY.

The fault analytics system may be applied to KPIs or MUES. However, for proper operation, KPIs and MUES must be properly normalized and aggregated. In the case of MUES the experience scores are represented on a scale of 0 to 5. This is similar to the classic MOS score (Mean Opinion Score) used to measure voice quality. In the case of MUES, this is sufficient "normalization" since the experience is represented on consistent scale. For example VOICE MUES and DATA MUES are represented on a scale of 0 to 5.

Figure 8:
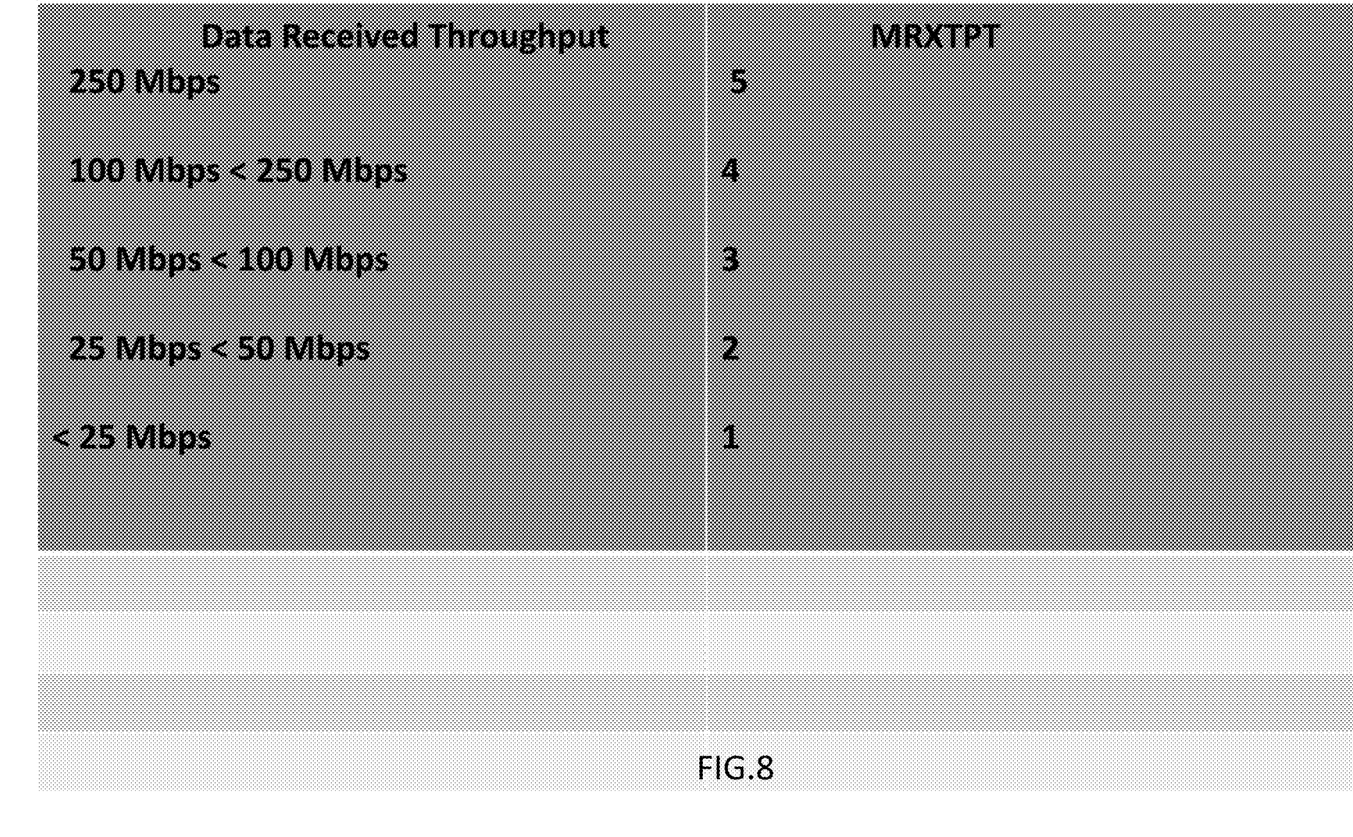
FIG. 8 is a table.

The fault analytics system may be applied to a KPI, however for correct operation of the system the KPI needs to be normalized. Although there are various forms of normalization, the fault analytics system normalizes KPIs to "Experience KPIs" termed "MKPI." For example, experience normalization of the Data Received Throughput is exemplified in the table of FIG. 8.

After normalization the next important requirement is in proper aggregation of MUES and MKPIs in order to represent customer experience. The following example demonstrates how to aggregate for customer experience, that is, to properly form the values of the DM matrix and cell MUES corresponding to CM. Consider the table of FIG. 9, for the MUES KPI MDROPRATE in cell c1. There are two aggregation rules for customer experience
1. Aggregate to the Device First
2. Average the Experience Score of all Users (MUES or MKPI)

Figure 9:
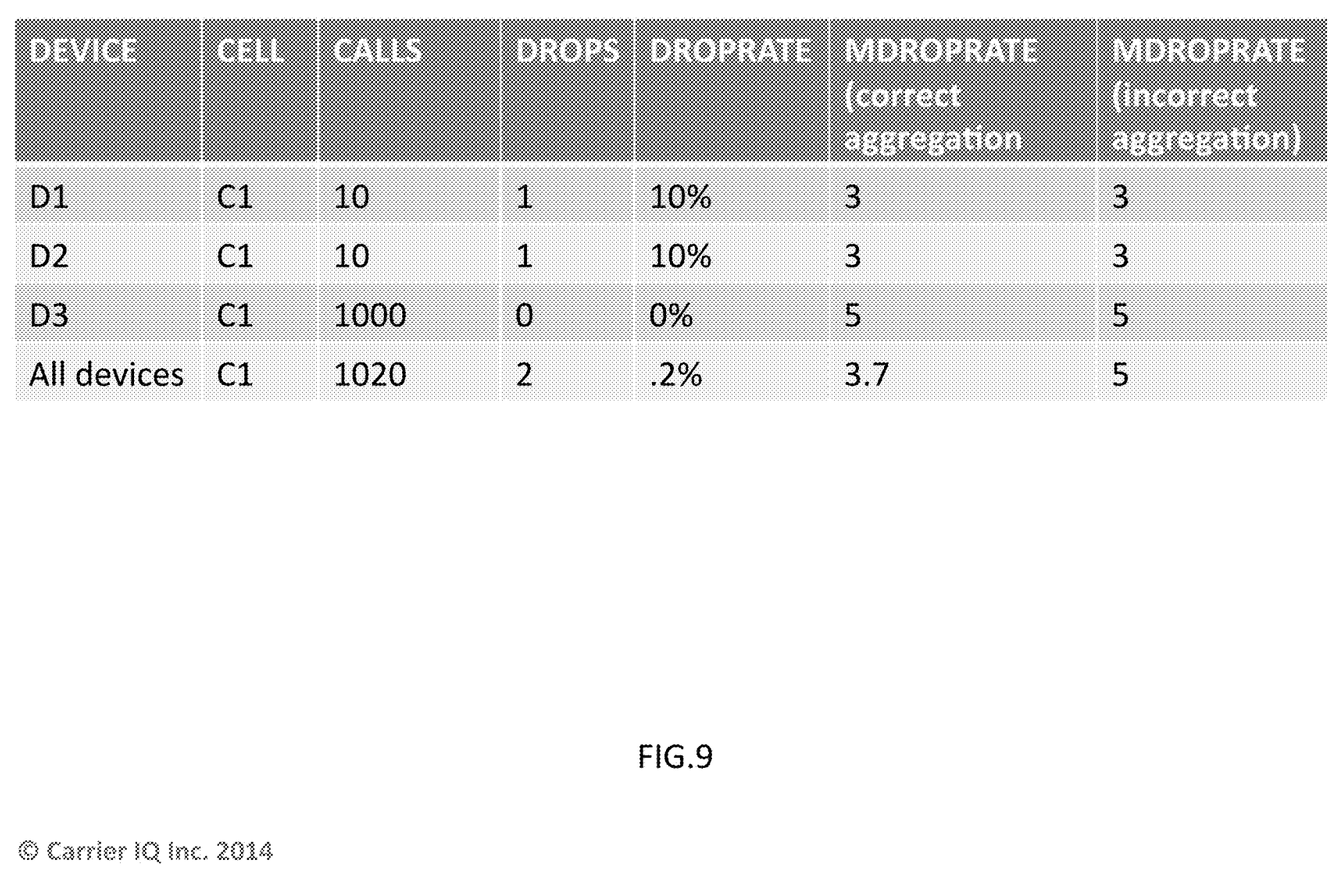
FIG. 9 is a table.

The last column (all devices row) illustrates the problem when these rules are not followed. In this example d1 and d2 receive an experience level of 3, where their corresponding call volume is low (10 calls), while d3 receives very good experience (0% drops) however its call volume is very high. When the customer experience is normalized and computed with respect to the device first, then the experience is averaged across the cells, the result reflects the average level of experience delivered to all users (6-th column). In aggregate it could be said that the cell overall has a low drop rate, however only one user experiences a high grade of experience while other users experience a lower grade of service. It would be incorrect to include the average level of experience delivered to all devices is high. Aggregation to reflect customer experience more accurately reflects the level of service delivered to all users.

Although the description of machine learning and decision logic (other sections of this document) refer only to MUES, the fault analytics system machine-learning and decision logic will work with MUES or MKPIs, as they are both measures of experience following the rules for normalization and aggregation.

The method for generation of a fault signature, consists of loading the fault model parameters generated by the machine learning, receiving diagnostic information from a mobile device(s), generation of the predictor variables (DM, AVCM), fault detection logic, application of device or network fault localization logic, and integration of Root Cause information. In an embodiment, this process operates on an individual device, for example in response to a customer complaint. Additionally, it can be applied to groups of devices in order to proactively improve customer experience.

The system compares aggregated scores (as per the fault model) anticipated for a mobile device used in selected geographic service areas with the actual score of a particular end user of a particular wireless service in the identical geographic service area to determine when there is a statistically significant relative debility.

As illustrated in FIG. 5, the fault model apparatus receives DM and AVCM (computed from the devices under consideration) as input and receives BAD_MIUES_THR, CM, NET_THR and DEV_THR from the fault model parameters store. DM is the device MUES, or vector of MUES scores if the model is applied to more than one device, and AVCM is the visited cell MUES for the device(s). The computation of the AVCM and DM are as described previously, Fault Model generation, that is Machine Learning. However, while operating the fault model, post learning, the predictor variables are derived from the input devices under evaluation. In other words, the DM (device MUES) are generated entirely on input from the devices under consideration without input from the machine learning fault parameters. However, in order to generate the AVCM the cell MUES CM are needed. As described previously ("Fault Model Machine-Learning") the visited cells corresponding to the input device(s) are noted in the DCI matrix, thus a DCI matrix is formulated for the devices of interest. Then from the CM, cell MUES generated by the machine learning, the AVCM corresponding to the input device (s) is produced. In addition to the 4-decision rule parameters defined previously, one additional set of decision parameters are employed. That is, when a root cause is returned then the logic will use the root cause for classification as a device issue or a network issue. This addresses the case when there is more detailed information available in addition to the Device or Network fault localization.

A system, apparatus, and method of operation receive and transform measurements from a plurality of wireless devices into scores for each mobile end user experience for use by a customer support organization to guide investment in the network, achieve customer satisfaction with services and wireless devices, and thereby reduce costs of returned equipment and lost customers.

One aspect of the present invention performs, by a processor, Fault Model Decision Process.

The fault model decision process generates a fault signature by applying the parameters learned from the machine learning to the inputs (AVCM, DM and Root Cause).

The decision process is illustrated in the form of a decision tree of computer implemented steps shown in FIG. 6. The first decision step is determining whether or not there is a fault. If not (false), a fault signature indicating "No Fault" is produced, while the other two entries are null.

The second step determines, if there is a fault, and if there is a Root Cause (not null).

In the third step, if the Root Cause is available, the Root Cause will control if the fault is localized to the Network or not to the Network i.e. the Device.

In the fourth and fifth steps, it will determine if the Root Cause is not available (Root Cause is null) then the Device or Network fault location is effectively produced by the device versus network algorithm, that is, the respective devices AVCM relative to NET_THR and DEV_THR, without more explicit root cause.

Another aspect of the invention is an apparatus. An apparatus for determination if a problem can be attributed to a network environment or attributed to an individual device comprising: a circuit output device; a circuit output network; a circuit input for the device drop rate, KPId; a circuit input for drop call rate KPI Scores corresponding to Cells the device visited, [C1KPId, C2KPId, C3 . . . ]; and an inequality evaluation circuit, KPId<CiKPId (for all Cells the device visited).

In embodiment, the apparatus determines "DEVICE" when the inequality is True.

In an embodiment, the apparatus determines "NETWORK" when the inequality is Not True.

Another aspect of the invention is a system 500 for determination of a fault signature vector (FS), the system having: a logic tree circuit 600; the logic tree circuit coupled to receive a match or a non-match from root cause pattern analysis circuits 520-550; the logic tree circuit coupled to receive crowd parameters from a crowd parameter determination system 400; and the logic tree circuit coupled to receive specific characteristics from a device specific characteristics circuit 300.

In an embodiment the logic tree circuit 600 is configured to perform the following transformations shown in FIG. 6: DM greater than BAD_MUES_THR, Root Cause not equal to NULL, Root Cause is an element of the set {Network Set}, AVCM is less than or equal to NET_THR, and AVCM is greater than or equal to DEV_THR in order to emit an FS.

In an embodiment, the root cause pattern analysis circuits 520-550 comprise tables of symptoms and root causes and pattern matching circuits.

In an embodiment, the device specific characteristics circuit 300 comprises a first device MUES subcircuit 310 and a second AVCM subcircuit 370.

In an embodiment, the crowd parameter determination system 400 comprises: a device MUES circuit 310, coupled to a find bottom p-th percentile circuit 420, to determine BAD_MUES_THR, a device cell MUES circuit 440, coupled to a cell MUES circuit 450, to determine a CM vector, and an AVCM circuit 370 coupled to cell MUES circuit 450, coupled to an AVCM_GMUES AND AVCM_B-MUES circuit 480, coupled to a NET_THR and DEV_THR circuit 490.

CONCLUSION

A customer experience fault analysis remediation support system for wireless user devices compares the measured experience of an individual to the characteristics of the population of devices as a cohort. The fault diagnosis enables a customer service representative to deliver accurate remediations for customer satisfaction issues. The apparatus receives and transforms data from a sample of all served wireless devices and transforms the individual metrics into characteristics for every wireless cell. User experience scores are computed, normalized and aggregated in many dimensions. Measures of an individual user experience are determined from data taken on the device and compared with thresholds based on the population and from similar situated devices. A fault signature is provided to a customer support representative or organization which characterizes the fault into the dimensions of fault detection, localization, and root causes.

The present invention can be easily distinguished from conventional depot based failure analysis. For privacy reasons, a device is conventionally restored to factory settings upon return by the user. By contrast, the invention includes the major steps or components being connected/coupled/performed:

generating normalized experience KPIs and experience aggregation (normalized experience measures)—prevent one users KPI to overwhelm the localized aggregations and therein provide an aggregated per user experience KPI for the locality (i.e., cell id);

machine learning to generate KPI statistics and fault model parameters;

detecting an abnormal experience (fault detection) (device vs crowd hypothesis test);

independently applying root cause predictive models and integrating root cause results;

applying device vs. network fault model decision logic; and combining fault detection, fault localization (i.e. fault dimension) and root cause into a fault signature.

The beneficial transformation of data recorded on a mobile wireless device generates a fault signature, which partitions system (i.e., solution) and the output into increasingly useful and actionable parts: detected problem, fault localization (dimension), and finds root cause. Depending on the amount of diagnosis information available the system provides increasingly useful amount of information.

Fault signatures enable business systems to take the most effective action for fixing a problem that could otherwise become a no fault return or a customer dissatisfaction issue. It can be easily appreciated that the invention is distinguished from conventional systems by its     normalized experience KPIs, User Experience Scores and experience aggregations     out of norm detection based on experience KPI statistics     separating the fault detection, fault localization, and root cause determination allow for different subsystems each optimized for the corresponding function to be better applied to the problem and thus generate more effective answer.

combining the results into an actionable fault signature with increasing levels of actionable information.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a non-transitory machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Figure 1:
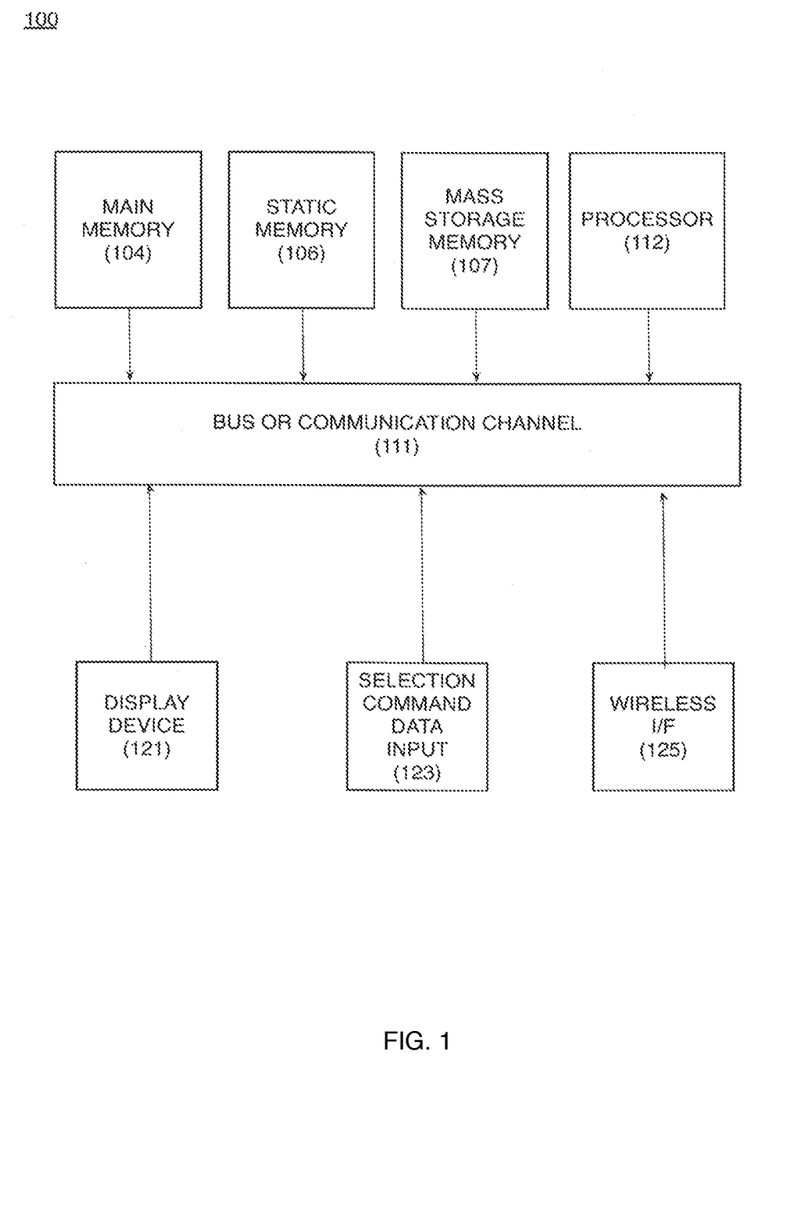
FIG. 1 is a block diagram of a conventional processor used for performing method steps in an apparatus.

FIG. 1 illustrates an exemplary programmable processor comprising a bus or communication channel 111 coupling main memory 104, static memory 106, mass storage memory 107, and a processor circuit 112 for executing instructions, and in embodiments at least one interface to couple a display device 121, a selection command data input 123, and/or a wireless interface 125.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

SEQUENCE LISTING

Not Applicable

The invention claimed is:

1. A system for determination of a fault signature vector for a device operating in a network, the system comprising:

a logic tree circuit;

the logic tree circuit coupled to root cause pattern analysis circuits, wherein the root cause pattern analysis circuits determine whether device parameters of the device match root causes, wherein the logic tree circuit receives a match or a non-match with a root cause from the root cause pattern analysis circuits;

the logic tree circuit coupled a crowd parameter determination system, wherein the logic tree circuit receives crowd parameters from the crowd parameter determination system and the crowd parameters are determined from a plurality of devices operating in the network; and     the logic tree circuit coupled a device specific characteristics circuit, wherein the logic tree circuit receives specific characteristics from the device specific characteristics circuit,     wherein the logic tree circuit determines the fault signature vector based on the match or the non-match of the device parameters to one of the root causes, and from a comparison between the crowd parameters and the specific characteristics, wherein the fault signature vector determines whether a fault experienced by the device is associated with the device or with the network,     wherein the device specific characteristics circuit comprises a first device mobile user experience score subcircuit that generates a mobile user experience score and a second average cell mobile user experience score subcircuit that generates an average cell mobile user experience score.

2. The system of claim 1 wherein the logic tree circuit is configured to perform the following transformations:

determining if a mobile user experience score of the device under analysis is greater than a bad mobile user experience score threshold,     determining if the Root Cause is not equal to NULL,     determining if the Root Cause is an element of a set, determining if an average cell mobile user experience score is less than or equal to a network threshold, and
determining if the average cell mobile user experience score is greater than or equal to a device threshold
in order to emit the fault signature vector.

3. The system of claim 1 wherein the root cause pattern analysis circuits comprise tables of symptoms and root causes and pattern matching circuits.

4. The system of claim 1 wherein the crowd parameter determination system comprises:
a device mobile user experience score circuit, circuit, coupled to a find bottom percentile circuit, to determine bad mobile user experience threshold, wherein the bottom percentile circuit corresponds to a first probability distribution of the mobile user experience scores,
a device cell mobile user experience score circuit, coupled to a cell mobile user experience score circuit, to determine cell mobile user experience score vector, and
an average cell mobile user experience score circuit coupled to the cell mobile user experience score circuit, coupled to a first probability distribution circuit and to a second probability distribution circuit, coupled to a network threshold circuit and a device threshold circuit, wherein the first probability distribution circuit is related to good average cell mobile user experience scores and the second probability distribution is related to bad average cell mobile user experience scores.

5. A system for determining whether a fault in a device operating in a network, wherein a plurality of devices are connected with the network, the system comprising:
a logic tree circuit, wherein the logic tree circuit is coupled to root cause pattern analysis circuits, a crowd parameter determination system, and a device specific characteristics circuit;
wherein the root cause pattern analysis circuits determine whether the fault is associated with a root cause by comparing device parameters to a plurality of patterns;
wherein the crowd parameter determination system determines scores associate with the plurality of devices;
wherein the device specific characteristics circuit associated determines specific characteristics associated with the device,
wherein the logic tree circuit localizes the fault to the device or to the network based on the match or the non-match to the root cause, the crowd parameters, and the specific characteristics,
wherein the fault is localized to the device when the root cause is not a match and when an average cell mobile user experience score is less than an network threshold and greater than a device threshold.

6. The system of claim 5, wherein the logic tree circuit transforms mobile user experience scores received by the device specific characteristics circuit and the crowd parameter determination system into a measure that isolates the fault to the device or to the network.

7. The system of claim 5, wherein the fault includes one or more of a fault detection, a device versus network fault localization, and a root cause.

8. The system of claim 7, wherein the fault is displayed on a display apparatus.

9. The system of claim 5, wherein the specific characteristics are determined from data recorded in a recent history of the device.

10. The system of claim 5, wherein the logic tree circuit compares scores specific to the device with scores specific to the plurality of devices to determine whether the fault is localized to the device or to the network.

11. The system of claim 10, wherein the fault is localized to the device when the root cause is a match and when the root cause is not in a network set of root causes.

12. A system for determination of a fault signature vector for a device operating in a network, the system comprising:
a logic tree circuit;
the logic tree circuit coupled to root cause pattern analysis circuits, wherein the root cause pattern analysis circuits determine whether device parameters of the device match root causes, wherein the logic tree circuit receives a match or a non-match with a root cause from the root cause pattern analysis circuits;
the logic tree circuit coupled a crowd parameter determination system, wherein the logic tree circuit receives crowd parameters from the crowd parameter determination system and the crowd parameters are determined from a plurality of devices operating in the network; and
the logic tree circuit coupled a device specific characteristics circuit, wherein the logic tree circuit receives specific characteristics from the device specific characteristics circuit,
wherein the logic tree circuit determines the fault signature vector based on the match or the non-match of the device parameters to one of the root causes, and from a comparison between the crowd parameters and the specific characteristics, wherein the fault signature vector determines whether a fault experienced by the device is associated with the device or with the network,
wherein the crowd parameter determination system comprises:
a device mobile user experience score circuit, circuit, coupled to a find bottom percentile circuit, to determine bad mobile user experience threshold, wherein the bottom percentile circuit corresponds to a first probability distribution of the mobile user experience scores,
a device cell mobile user experience score circuit, coupled to a cell mobile user experience score circuit, to determine cell mobile user experience score vector, and
an average cell mobile user experience score circuit coupled to the cell mobile user experience score circuit, coupled to a first probability distribution circuit and to a second probability distribution circuit, coupled to a network threshold circuit and a device threshold circuit, wherein the first probability distribution circuit is related to good average cell mobile user experience scores and the second probability distribution is related to bad average cell mobile user experience scores.

* * * * *